March 29, 1966 H. R. SHILLINGTON 3,243,779

DATA PROCESSING CIRCUIT

Filed Aug. 22, 1961 7 Sheets-Sheet 1

INVENTOR
H. R. SHILLINGTON
BY R. C. Schwarz, Jr.
ATTORNEY

March 29, 1966 H. R. SHILLINGTON 3,243,779

DATA PROCESSING CIRCUIT

Filed Aug. 22, 1961 7 Sheets-Sheet 2

INVENTOR
H. R. SHILLINGTON
BY A. C. Schwarz, Jr.
ATTORNEY

INVENTOR
H. R. SHILLINGTON
BY A. C. Schwarz, Jr.
ATTORNEY

INVENTOR
H. R. SHILLINGTON
BY A. C. Schwarz, Jr.
ATTORNEY

INVENTOR
H. R. SHILLINGTON
BY Q. C. Schwarz, Jr.
ATTORNEY

| DECIMAL DIGIT REGISTERED | FOUR LINE BINARY CODE 1ST BINARY LINE | 2ND BINARY LINE | 3RD BINARY LINE | 4TH BINARY LINE |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

0 REPRESENTS (−) 15 OR GREATER NEGATIVE VOLTAGE

1 REPRESENTS GROUND OR POSITIVE VOLTAGE

| SOLENOID | CHANNELS 0 | 1 | 2 | 3 | 4 | 5 | 6 | 7 | 8 | 9 |
|---|---|---|---|---|---|---|---|---|---|---|
| 1 | X | X | X | | | | X | | | |
| 2 | X | | | X | X | | | X | | |
| 3 | | X | | X | | X | | | X | |
| 4 | | | X | | X | X | | | | X |

INVENTOR
H. R. SHILLINGTON
BY A. C. Schwarz, Jr.
ATTORNEY

DATA PROCESSING CIRCUIT

INVENTOR
H. R. SHILLINGTON
BY Q. C. Schwarz, Jr.
ATTORNEY

United States Patent Office 3,243,779

Patented Mar. 29, 1966

3,243,779

DATA PROCESSING CIRCUIT

Harry R. Shillington, Glen Ellyn, Ill., assignor to Western Electric Company, Incorporated, a corporation of New York Filed Aug. 22, 1961, Ser. No. 133,178
15 Claims. (Cl. 340—172.5)

This invention relates to a circuit for processing data signals, and more specifically to a circuit for controlling the transmission of data signals to a first data storing and transforming circuit and from a second data storing and transforming circuit in timed relationship with respect to the transmission of data signals therebetween. An object of this invention is to provide a new, simple, and economical circuit of this character.

In the processing of cyclically transmitted data signals, it is often desirable to read out previously stored data signals while new data signals are being stored. Often, the new data signals must also be transformed into modified data signals that are required for controlling a specific operation. By controlling both the transmission of new data signals to a first data storing circuit having transformation characteristics and the output transmission of data signals from a second data storing circuit having transformation characteristics in leading timed relationship with respect to the transmission of data signals from the first data storing circuit to the second data storing circuit, such a desirable result may be accomplished.

More specifically, in the measuring and sorting of capacitors, it is often desirable to measure the capacitance value of one capacitor while the ejection of a capacitor measured during the last preceding cycle of operation is controlled simultaneously, so that the previously measured capacitor is ejected into a container for a predetermined capacitance range. Another object of this invention is to provide a data processing circuit for performing this function.

Another object of this invention is to provide an improved data processing circuit (1) for providing a coded digital output representative of a measured capacitance value of a capacitor wherein each digit is represented by a plurality of data signals, (2) for selecting a prescribed group of digits of the coded digital output, and (3) for transforming the plurality of data signals of each selected digit into a single data signal representative of the selected digit.

An additional object of this invention is to provide an improved data processing circuit wherein a visual reading of the circuit output is provided.

A further object of this invention is to provide an improved data processing circuit wherein operation of the circuit may be simulated and a check visual reading of the circuit output may be provided during the simulated operation.

A still further object of this invention is to provide an improved decoding circuit (1) for selecting a prescribed group of digits of a coded digital output, wherein each digit is represented by a plurality of data signals, (2) for transforming the plurality of data signals of each selected digit into a single or unitary data signal representative of the selected digits, (3) for transforming the data signals of the selected group of digits into a single data signal representative of the numerical value represented by the selected group of digits, and (4) storing the single data signal so that this signal may be used subsequently as a control signal.

With these and other objects in mind, the present invention relates to a circuit for processing data signals transmitted from a source of data. A storage and transformation circuit is provided for storing data signals representative of a numerical value, which are transmitted from the source of data, and for transforming the stored data signals into a coded digital output representative of the numerical value thereof, wherein each coded digital output digit is represented by a plurality of independent data signals. The data signals of a preselected group of the coded digital output digits are transmitted to a storage and decoding circuit (storage and transformation circuit) wherein they are stored and are transformed into straight decimal digital form so that each digit is represented by a single or unitary data signal. A cyclically operable control circuit is provided for controlling both the transmission of new data signals to the storage and transformation circuit and the transmission of data signals from the storage and decoding circuit in leading timed relationship with respect to the transmission of the data signals of the selected coded digital output digits from the storage and transformation circuit to the storage and decoding circuit.

More specifically, the present invention relates to a circuit for measuring the capacitance values of capacitors and for controlling the ejection of the capacitors from capacitor carrying fixtures into containers for various ranges of capacitance values. Sequential electrical pulses are transmitted from a pulser network to a counter circuit for a period of time required to charge a capacitor in test to a predetermined potential. The counter circuit counts the pulses and provides a four line seven digit binary coded output representative of the capacitance value of the capacitor being measured based on charging time. A selector switch circuit is preset manually to select the four most significant consecutive digits of the binary coded output and the data signals of these digits are transmitted to a decoding circuit wherein the binary coded output digits are transformed into straight decimal form so that each digit is represented by a unitary data signal. The straight decimal unitary data signals are transmitted to a crossbar switch circuit wherein a single data signal representative of the number represented by the four straight decimal data signals is produced. A cell memory circuit is responsive to the data signal produced in the crossbar switch circuit and codes the fixture carrying the capacitor in test so that the capacitor is ejected into a container for a capacitance range within which its value falls.

A cyclically operable control circuit controls operation of the various circuits so that pulses are transmitted to the counter circuit and data signals are transmitted from the decoding circuit to the crossbar switch circuit in leading timed relationship with respect to the transmission of data signals from the counter circuit to the decoding circuit. Thus the capacitance value of a new capacitor may be measured while the ejection of the capacitor measured during the last preceding cycle of operation is controlled simultaneously.

Other objects and advantages of the invention will become apparent by reference to the following detailed description and the accompanying drawings illustrating a preferred embodiment thereof, in which.

Figures 1, 2, 9:
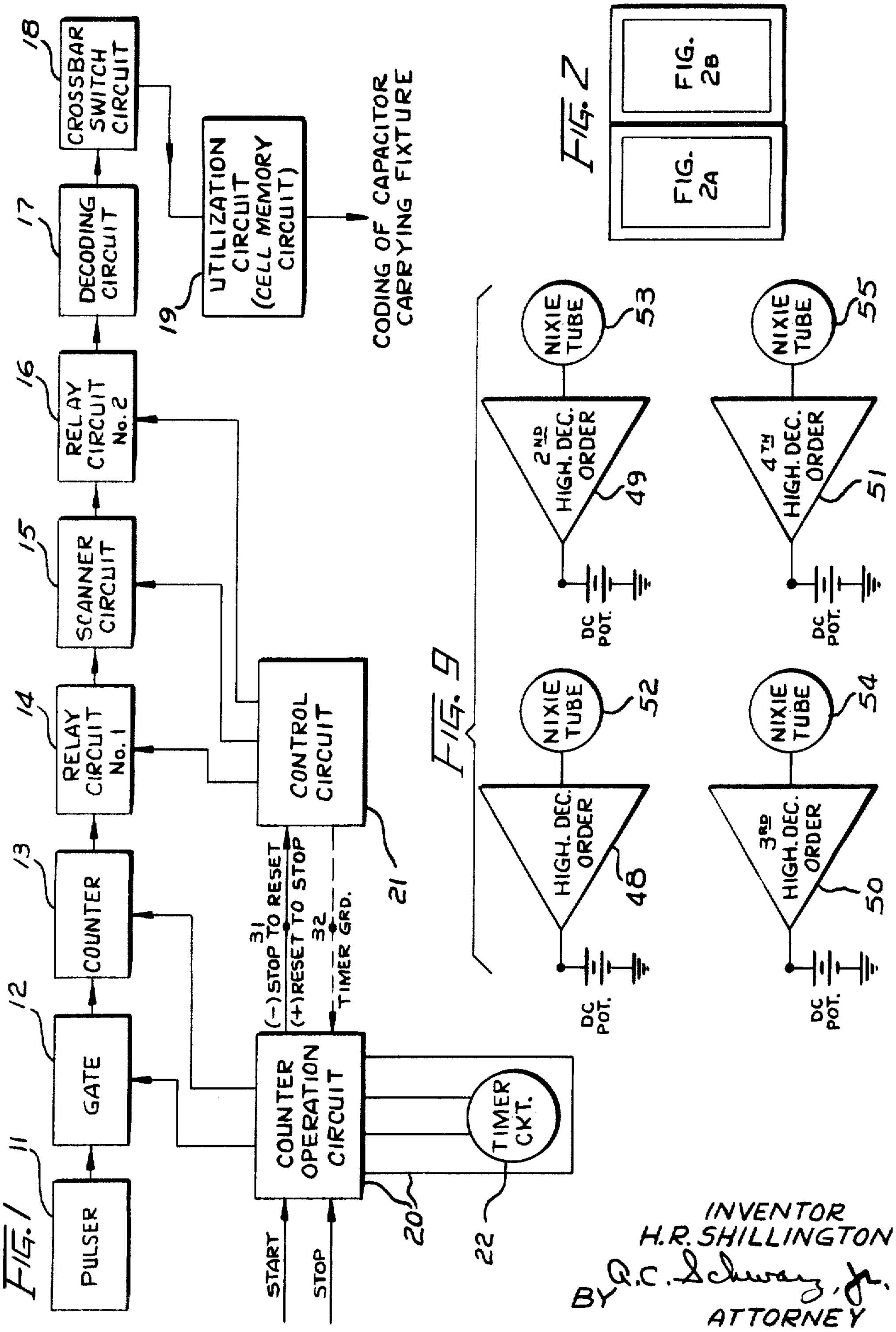
FIG. 1 is a block diagram of a general embodiment of the data processing circuit and more specifically illustrates the interconnection between the various circuit elements.
FIG. 2 is a block diagram of the interconnection between FIGS. 2A and 2B.
FIG. 9 is a block diagram of a second group of relay tree circuits illustrating the connection of Nixie tubes (numerical display tubes) thereto for providing a visual output reading of the relay tree circuits.

The invention is disclosed in the drawings as applied to an apparatus for measuring the capacitance value of capacitors and for selectively sorting the capacitors into a plurality of containers in accordance with their measured capacitance values. It is to be understood that the invention is not limited to this specific application but may be altered by those skilled in the art to provide numerous other arrangements.

The basic apparatus of the invention is illustrated in simplified block form in FIG. 1. A continuously operating pulser 11 produces sequential electric pulses which are transmitted through a gate 12 to a counter 13 (storage and tranformation circuit). The gate 12 is maintained in an open position for a period of time required to charge a capacitor being measured to a predetermined potential so as to permit passage of pulses from the pulser 11 to the counter 13. The pulses transmitted through the gate 12 are counted in the counter 13 and the counter is calibrated to provide an output which is representative of the capacitance value of the capacitor as determined by the time required to charge the capacitor to the predetermined potential. It should be noted that the pulse 11, the gate 12, the counter 13, and a counter operation circuit 20 are available both as independent commercial units and as a combined commercial unit.

Figures 5, 7, 8:
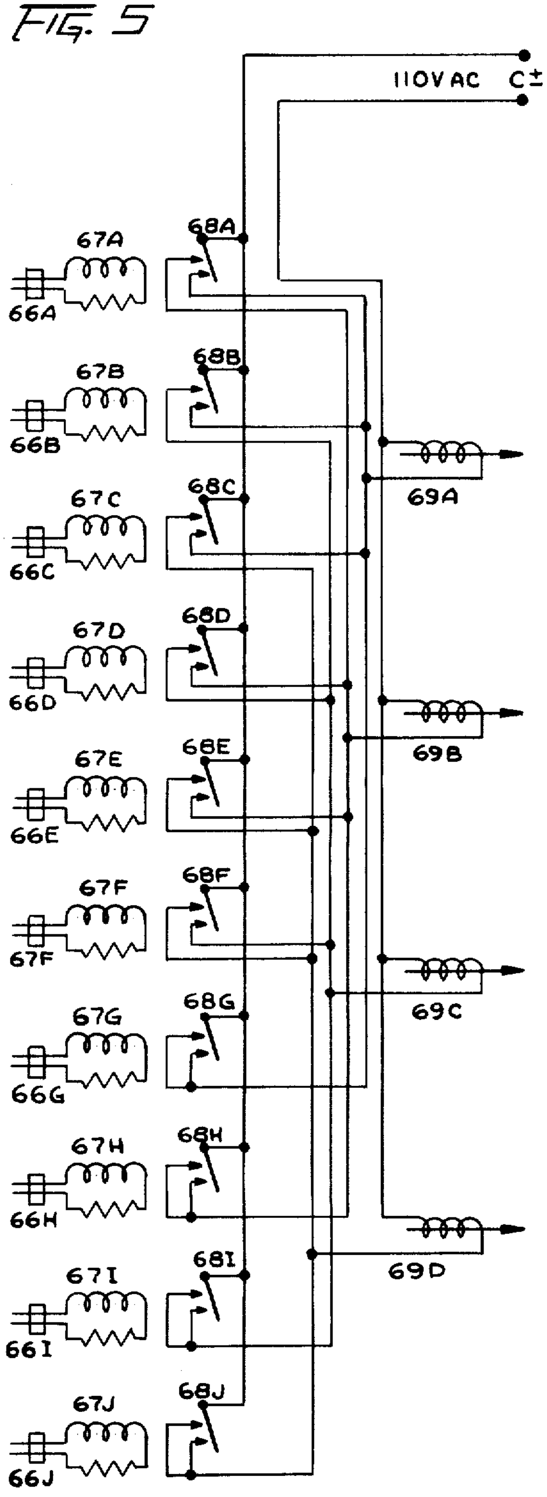
FIG. 5 is a schematic diagram of a cell memory circuit illustrated by the utilization circuit block 19 in FIG. 1 illustrating a circuit utilized to control the coding of a capacitor carrying fixture in response to a data signal transmitted from a crossbar switch circuit so that a capacitor carried in the capacitor carrying fixture is ejected into a predetermined container.
FIG. 7 is a table illustrating a key for the binary coded digital output signals.
FIG. 8 is a table illustrating a key for the operation of the cell memory circuit solenoids.

In the preferred type of counter, a four line seven digit binary code output is provided in response to the counting of the input pulses. More specifically, various combinations of four data signals are provided to represent the numerical digit of each of the seven decimal orders. A table illustrating the combinations of the four data signals which represent each of the ten possible digits of each decimal order is illustrated in FIG. 7 wherein a 0 represents a −15 volts or a greater negative voltage applied to a particular line of the binary code output and wherein a 1 represents a ground or positive potential applied to a particular binary line.

The counter 13 includes a plurality of flip flops (not shown) which are associated with the binary code lines and which effect the application of 0 or 1 data signals to the binary lines in response to the counting of pulses transmitted from the pulser 11. When a flip flop is in a first condition, a 0 data signal is applied to the associated binary line and, when a flip flop is in a second condition, a 1 data signal is applied to the associated binary line. Hereinafter, the counter output will be referred to as a coded digital output.

The coded digital data signals of the counter 13 are transmitted to a first relay circuit 14 wherein four consecutive decimal orders of the coded digital output are selected and the data signals of these selected decimal orders are transmitted to a scanner circuit 15 wherein they are stored. The four selected decimal orders are preselected manually by an operator as the four most significant consecutive decimal orders which are expected to be produced by the counter.

The data signals of the four selected decimal orders stored in the scanner circuit 15 are transmitted through a second relay circuit 16 to a decoding circuit 17, which transforms these four decimal orders into straight decimal digital form wherein each decimal order is represented by a single or unitary data signal. When combined, the scanner circuit 15 and the decoding circuit 17 form a storage and decoding circuit (storage and transformation circuit).

The highest decimal order unitary data signal produced in the decoding circuit is utilized to permit or prohibit output transmission of the second highest decimal order data signal. The lower three decimal order data signals are transmitted to an apparatus known in the telephone art as a crossbar switch circuit 18 wherein a single data signal is produced which is representative of the four digit number represented by the four decimal order data signals. A data signal is produced in the crossbar switch circuit only when all three of the lower three decimal order data signals are transmitted thereto from the decoding circuit.

A utilization circuit 19 (cell memory circuit) is connected to the crossbar switch circuit 18 and is responsive to data signals produced in the crossbar switch circuit for coding capacitor carrying test fixtures so that measured capacitors are ejected from the capacitor carrying test fixtures into containers for capacitance ranges within which the capacitance values of the capacitors fall.

A control circuit 21 and the previously referred to counter operation circuit 20 operate the gate 12, operate the relay circuits 14 and 16, reset the counter 13, and reset the scanner circuit 15 in such a sequence that the above-described operations of counting, selecting four consecutive decimal orders and decoding are provided.

More specifically, these circuits control operation of the various other circuit elements so that pulses are transmitted from the pulser 11 through the gate 12 to the counter 13 and data signals are transmitted from the scanner circuit 15 through the decoding circuit 17 and through the crossbar switch circuit 18 in the utilization circuit 19 in leading timed relationship with respect to the transmission of data signals from the counter 13 to the scanner circuit 15. Thus, the circuits 20 and 21 permit the capacitance value of a new capacitor to be measured while the ejection of a capacitor measured during the last preceding cycle of operation is controlled simultaneously.

In more detail, a continuous conveyor (not shown), having capacitor carrying fixtures mounted thereon, is provided for moving capacitors to be measured and sorted to various work stations. Capacitors are placed in the carrying fixtures at a loading work station by conventional means and the capacitor leads are gripped by grippers of the carrying fixtures. Subsequent to receiving and gripping a capacitor, each carrying fixture is moved to a capacitance measuring work station whereat the lead grippers are connected automatically in a capacitance measuring circuit so that a charging potential is applied to the capacitor.

When a capacitor has been positioned at the capacitance measuring work station, a relay is energized to close its contact, which applies the charging potential to the capacitor and which connects an electrical circuit (not shown) to the counter operation circuit 20 so that a start signal is applied thereto. In response to the start signal, the counter operation circuit 20 operates to energize a relay which closes its normally open contact (opens gate 12) so as to permit transmission of the pulses from the continuously operating pulser 11 to the counter 13.

When a capacitor in test has charged to a predetermined potential, a monostable multivibrator within the electrical circuit is flipped to a second condition to apply a stop signal to the counter operation circuit 20. In response to the stop signal, the counter operation circuit 20 operates to deenergize the gate relay which opens its normally open contact (closes gate 12) so as to prohibit further transmission of pulses to the counter 13. The counter operation circuit also initiates operation of the control circuit 21.

The control circuit 21 operates (1) to open the relay circuit 16 which prohibits transmission of data signals from the scanner circuit 15 to the decoding circuit 17, (2) to reset the scanner circuit 15 to condition it for receiving new data signals, (3) to close the relay circuit 14 so that new data signals are transmitted from the counter 13 to the scanner circuit 15 wherein they are stored, and (4) to initiate operation of a timer circuit 22 contained within the counter operation circuit 20 which is preset to time out in a prescribed period of time.

When the timer circuit times out, it resets the counter 13 to a "0" condition, it conditions the counter operation circuit 20 for receiving a subsequent start signal, and it reverses operation of the control circuit 21.

The control circuit 21 operates in reverse (1) to open the relay circuit 14 for prohibiting further transmission of data signals from the counter 13 to the scanner circuit 15, (2) to close the relay circuit 16 so that data signals stored in the scanner circuit 15 are transmitted through the decoding circuit 17 and the crossbar switch circuit 18 to the utilization circuit 19, and (3) to prohibit operation of the timer circuit 22. A new capacitor may then be placed in test and a charging potential may be applied thereto to begin the next cycle of operation.

A conventional capacitor test circuit may be utilized for applying a charging potential to a capacitor to be measured and for providing the start and stop signals in response to charging of the capacitor, as for example the circuit disclosed in U.S. Patent No. 2,929,021, issued on March 15, 1960 to H. R. Shillington.

In accordance with this brief description of the general operation of the apparatus, it may be seen that while the counter 13 is receiving and storing new data signals, data signals provided by the measurement of the last preceding capacitor are transmitted from the scanner circuit 15 through the decoding circuit 17 and the crossbar switch circuit 18 to the utilization circuit 19. After new data signals have been stored in the counter 13, the scanner circuit 15 is disconnected from the decoding, crossbar switch, and utilization circuits and is connected to the counter 13 so that new data signals are transmitted from the counter and are stored in the scanner circuit.

Figure 2A:
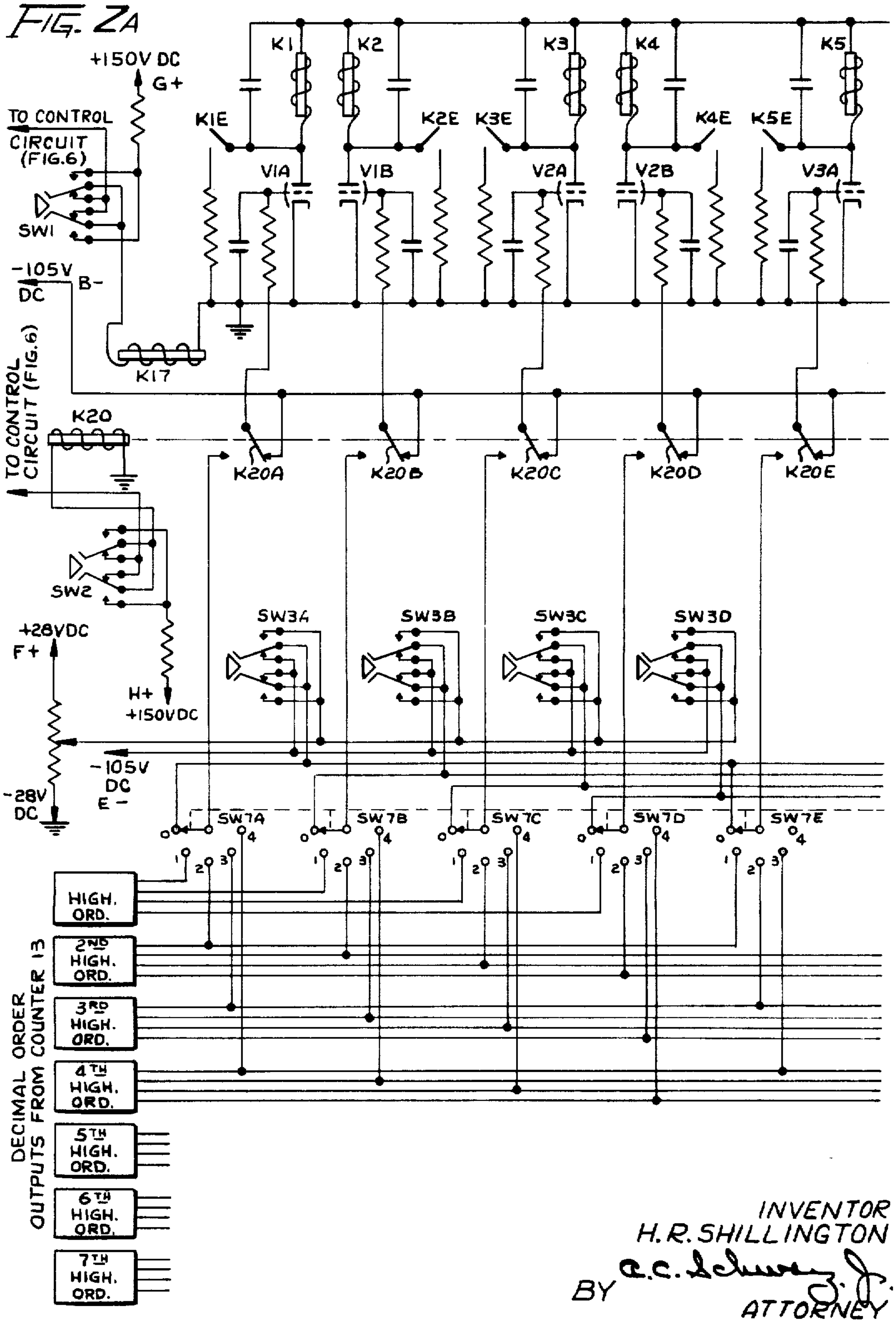
FIGS. 2A and 2B are partial schematic diagrams of a relay circuit and a scanner circuit illustrated by blocks 14 and 15 in FIG. 1 which, when connected as shown in FIG. 2, illustrate the interconnection of gang selector switches, control triodes, and control relays utilized for selecting any four consecutive digits of a digital binary coded output to be decoded.
Figure 2B:
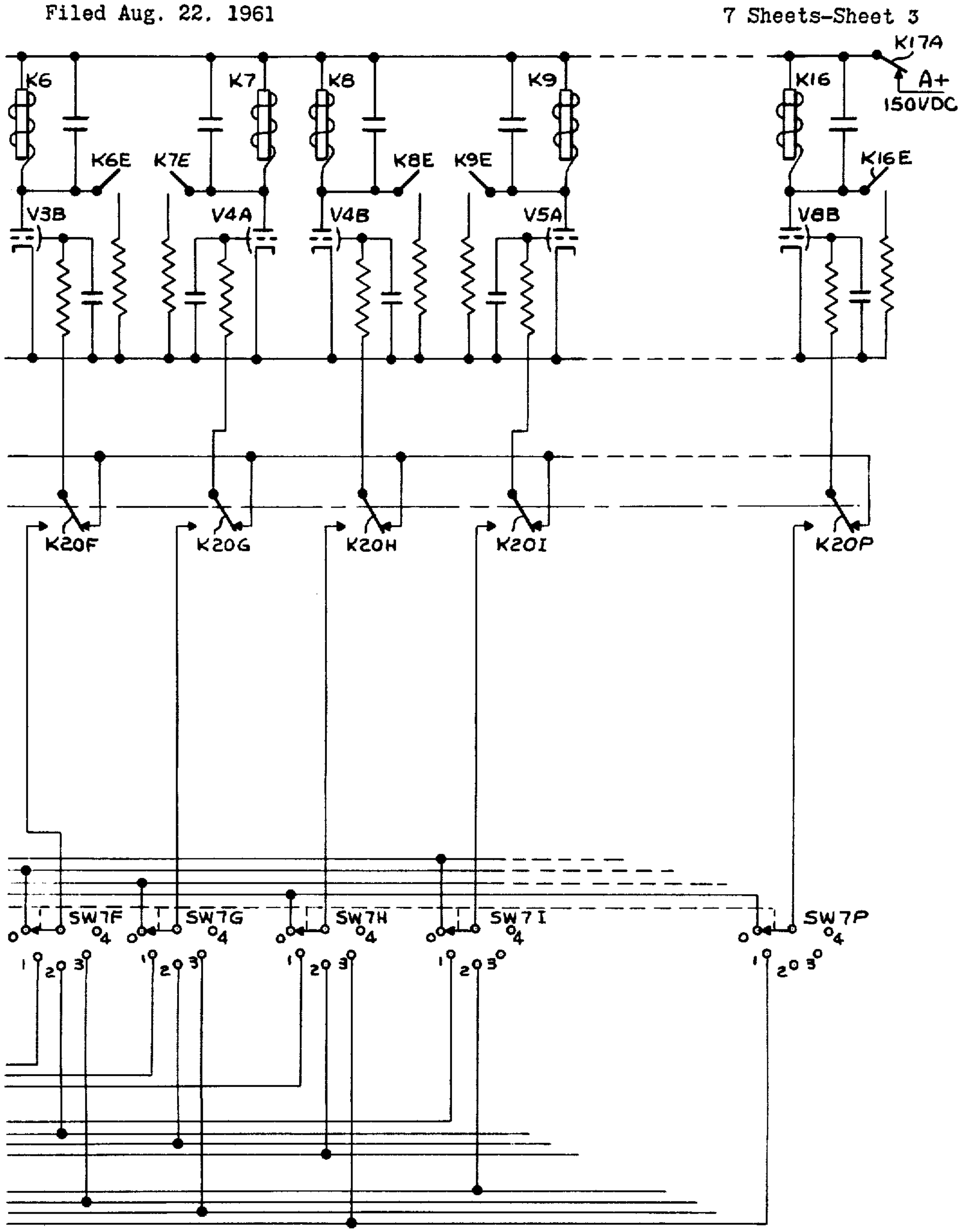

FIGS. 2A and 2B illustrate a preferred embodiment of the relay circuit 14 and the scanner circuit 15 which, as indicated above, are utilized for preselecting four consecutive decimal orders of the seven digit four line binary code counter output to be decoded. The coded digital data signals are transmitted from the counter 13 to sixteen selector switches SW7A–SW7P which are manually operable as a gang switch. Each of the selector switches has five selector position contact terminals and four of these contact terminals are connected to the coded digital output terminals of the counter. The fifth terminal of each selector switch is utilized for checking the operation of this circuit by simulation as described in detail hereinafter. Each coded digital output terminal is connected to a contact terminal on one or more of the selector switches, and if a coded digital output terminal is connected to more than one selector switch, it is connected to a different contact terminal on each selector switch.

A first contact terminal of each of the selector switches SW7A–SW7P is connected to only one of the coded digital output terminals of the highest, second highest, third highest, and fourth highest decimal orders of the coded digital output. Accordingly, when the gang switch is set so that the selector switch contact arms engage the first contact terminals, the sixteen coded digital output terminals of the highest four decimal orders are independently connected to the contact arms of different ones of the sixteen selector switches.

The second contact terminal of each of the selector switches is connected to only one of the coded digital output terminals of the second highest, third highest, fourth highest, and fifth highest decimal orders of the coded digital output. Accordingly, when the gang switch is set so that the selector switch contact arms engage the second contact terminals, the sixteen coded digital output terminals of the second highest four decimal orders are independently connected to the contact arms of different ones of the sixteen selector switches.

The third contact terminal of each of the selector switches is connected to only one of the coded digital output terminals of the third highest, fourth highest, fifth highest, and sixth highest decimal orders of the coded digital output. Accordingly, when the gang switch is set so that the selector switch contact arms engage the third contact terminals, the sixteen coded digital output terminals of the third highest four decimal orders are independently connected to contact terminals of different ones of the sixteen selector switches.

The fourth contact terminal of each of the selector switches is connected to only one of the coded digital output terminals of the fourth highest, fifth highest, sixth highest, and seventh highest decimal orders of the coded digital output. Accordingly, when the gang switch is set so that the selector switch contact arms engage the fourth contact terminals, the sixteen coded digital output terminals of the fourth highest four decimal orders are independently connected to contact arms of different ones of the sixteen selector switches.

Thus, it may be seen that an operator may preselect for decoding any four consecutive decimal orders of the coded digital output by setting the gang switch so that each selector switch contact arm engages one of the first four contact terminals.

The contact arm of each selector switch SW7A–SW7P is independently connected to a grid of one of sixteen control triodes V1A–V8B through one of sixteen contact arms K20A–K20P of a scanner circuit relay K20 when the associated contact arm is in engagement with its secondary (energized) contact terminal. The contact terminals of the selector switches SW7A–SW7P are so connected to the coded digital output terminals that when the scanner circuit relay K20 is energized and its contacts K20A–K20P are in engagement with their secondary contact terminals (1) the grids of a first group of four control triodes V1A–V2B are connected to the coded digital output terminals of the highest selected coded digital output digit to be decoded, (2) the grids of a second group of four control triodes V3A–V4B are connected to the coded digital output terminals of the second highest selected coded digital output digit to be decoded, (3) the grids of a third group of four control triodes V5A–V6B are connected to the coded digital output terminals of the third highest selected coded digital output digit to be decoded, and (4) the grids of a fourth group of four control triodes V7A–V8B are connected to the coded digital output terminals of the fourth highest selected coded digital output digit to be decoded. As illustrated in FIGS. 2A and 2B, the cathode of each control triode V1A–V8B is connected to ground, and the plate of each control triode is connected to a positive D.C. voltage source designated as A+ through one of sixteen control relays K1–K16 and through a normally closed reset relay contact K17A of a reset relay K17.

Each one of sixteen primary (deenergized) contact terminals of the scanner circuit relay K20 is connected to a negative D.C. voltage source designated as B—, so that when the relay K20 is not energized the negative D.C. voltage is applied to the grid of each of the control triodes V1A–V8B to maintain each control triode in a nonconducting state.

When the scanner circuit relay K20 is energized, its contact arms K20A–K20P move to their secondary (energized) contact terminals which complete a plurality of circuits from the output terminals of the selected coded digital output digits through the selector switches SW7A–SW7P and through the contact arms K20A–K20P to the grids of the control triodes V1A–V8B as set forth above. When a selected coded digital output terminal has a positive or ground potential data signal (binary code 1) applied thereto, the positive or ground data signal is transmitted to the grid of the associated one of the control triodes V1A–V8B to cause the control triode to conduct, which in turn, causes the associated one of the control relays K1–K16 to be energized. When a selected coded digital output terminal has a negative potential data signal (binary code 0) applied thereto, the negative data signal is transmitted to the grid of the associated one of the control triodes V1A–V8B and has no effect thereon, so that the associated one of the control relays K1–K16 is not energized.

Each of the control relays K1–K16 has a normally open locking contact K1E–K16E associated therewith which closes to lock in the control relay around the associated control triode V1A–V8B when the control relay is energized, so that energized ones of the control relays are not effected when the control triodes are placed in nonconducting states by denergizing relay K20.

Figure 3:
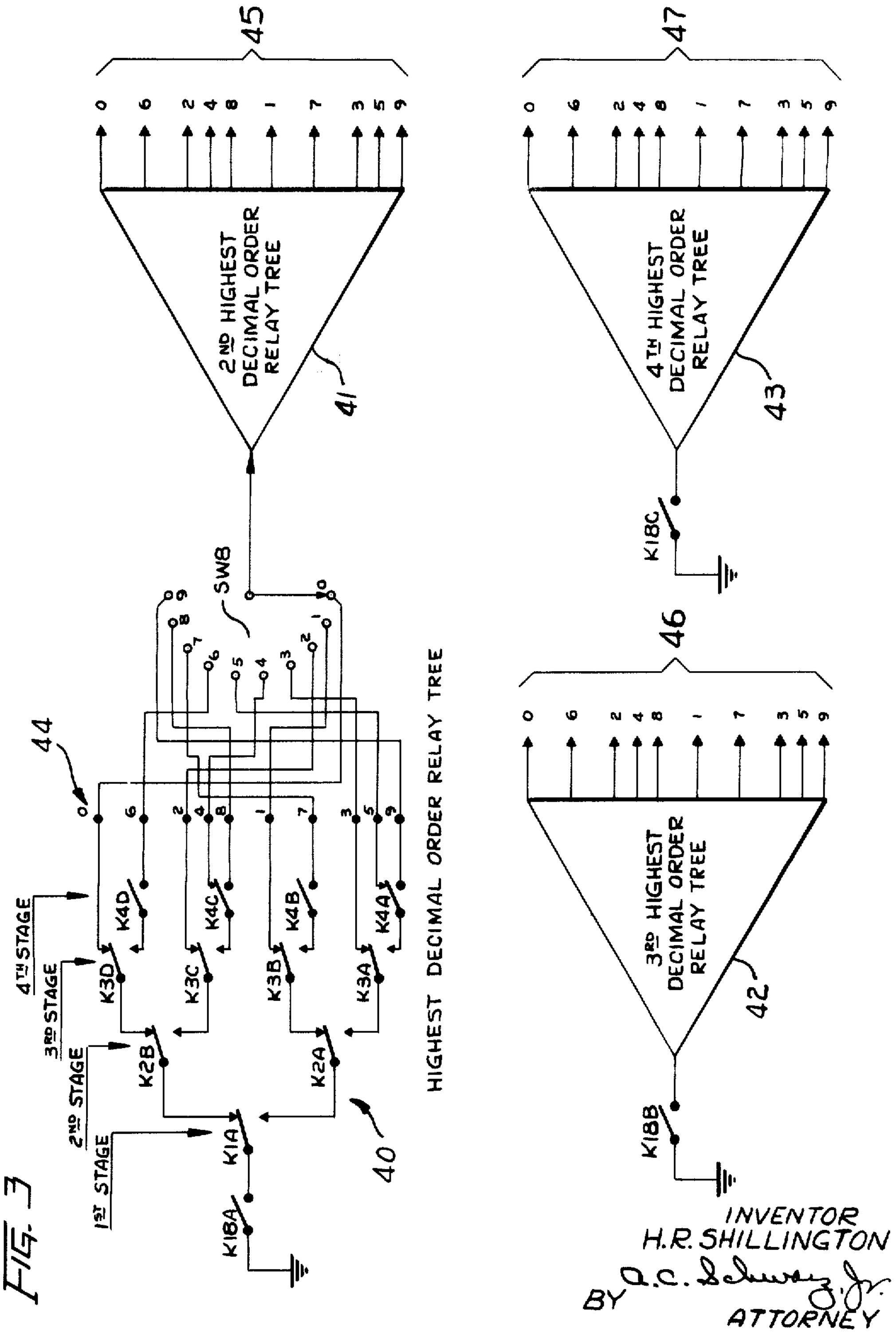
FIG. 3 is a schematic diagram of a relay circuit and a decoding circuit illustrated by blocks 16 and 17 in FIG. 1 illustrating the interconnection of relay contacts in a tree-like arrangement for transforming a four line digital binary code output into a straight decimal form output.

Each of the control relays K1–K16 also has other contacts associated therewith which are connected in relay tree circuits (see FIG. 3). The other contacts K1A–K4D of the control relays K1–K4 associated with the first group of control triodes V1A–V2B are connected in a first relay tree circuit 40 for providing a single data signal representative of the highest selected coded digital output digit; the other contacts K5A–K8D of the control relays K5–K8 associated with the second group of control triodes V3A–V4B are connected in a second relay tree circuit 41 for providing a single data signal representative of the second highest selected coded digital output digit; the other contacts K9A–K12D of the control relays K9–K12 associated with the third group of control triodes V5A–V6B are connected in a third relay tree circuit 42 for providing a single data signal representative of the third highest selected coded digital output digit; and the other contacts K13A–K16D of the control relays K13–K16 associated with the fourth group of control triodes V7A–V8B are connected in a fourth relay tree circuit 43 for providing a single data signal representative of the fourth highest selected coded digital output digit.

The previously referred to reset relay K17 is included in the scanner circuit to remove the positive D.C. plate voltage designated A+ from the scanner circuit upon energization thereof. In response to the removal of the D.C. plate voltage, deenergization or clearing of all the control relays K1–K16 is effected to condition the scanner circuit for accepting new data signals since this plate voltage is the energizing potential for the control relays.

Thus, it may be seen that the relay circuit 14 and the scanner circuit 15 provide for the decoding of any four consecutive digits of a seven digit four line binary coded output with only 16 control triodes being required, whereas 28 control triodes would generally be required; that is, one control triode would generally be required for each line of the coded digital output.

The relay circuit 16 and the decoding circuit 17 of FIG. 1 are shown in FIG. 3 illustrating the four relay tree circuits 40–43 which are identically interconnected and which transform the four selected consecutive digits of the coded digital output into straight decimal form wherein each digit is represented by a single ground data signal.

The relay trees 40, 42, and 43 associated with the first, third, and fourth highest decimal order digits to be decoded have ground input signals connected thereto through normally open relay contacts K18A, K18B, and K18C which must be closed before the relay tree circuits become effective to produce ground data signals at their outputs 44, 46, and 47. The relay tree circuit 41 associated with the second highest decimal order digit to be decoded has its input connected to the output 44 of the highest decimal order digit relay tree circuit 40 through a preset selector switch SW8. The data signal provided at the output 44 of the highest decimal order digit relay tree circuit must correspond to the presetting of the selector switch SW8 before the second highest decimal order digit relay tree circuit becomes effective to produce a ground data signal at its output 45.

As described above, each of the relay tree circuits 40–43 includes the contacts of four of the control relays K1–K16, and these relay contacts are connected in a symmetrical branching arrangement having four stages. Each of the relay contacts included in the relay tree circuits has a primary (deenergized) terminal and a secondary (energized) terminal. The highest decimal order relay tree circuit 40 is illustrated in detail in FIG. 3 and the relay contacts are interconnected as described below.

The first binary stage has one relay contact K1A associated therewith which is connected to ground through the normally open relay contact K18A. The second binary stage has two relay contacts K2A and K2B associated therewith; contact K2B is connected in series with the primary terminal of the contact K1A and contact K2A is connected in series with the secondary terminal of the contact K1A. The third binary stage has four relay contacts K3A, K3B, K3C and K3D associated therewith; contact K3A is connected in series with the secondary terminal of contact K2A, contact K3B is connected in series with the primary terminal of contact K2A, contact K3C is connected in series with the secondary terminal of contact K2B, and contact K3D is connected in series with the primary terminal of contact K2B. The fourth binary stage has four relay contacts K4A, K4B, K4C, and K4D associated therewith; contact K4A is connected in series with the secondary terminal of contact K3A, contact K4B is connected in series with the secondary terminal of contact K3B, contact K4C is connected in series with the secondary terminal of contact K3C, and contact K4D is connected in series with the secondary terminal of contact K3D.

Ten output terminals, each representing a decimal digit, are provided in each relay tree circuit; four of the output terminals are provided from the primary terminals of the third binary stage contacts, four of the output terminals are provided from the secondary terminals of the fourth binary stage contacts, and two of the output terminals are provided from primary terminals of two of the fourth binary stage contacts.

Figure 4:
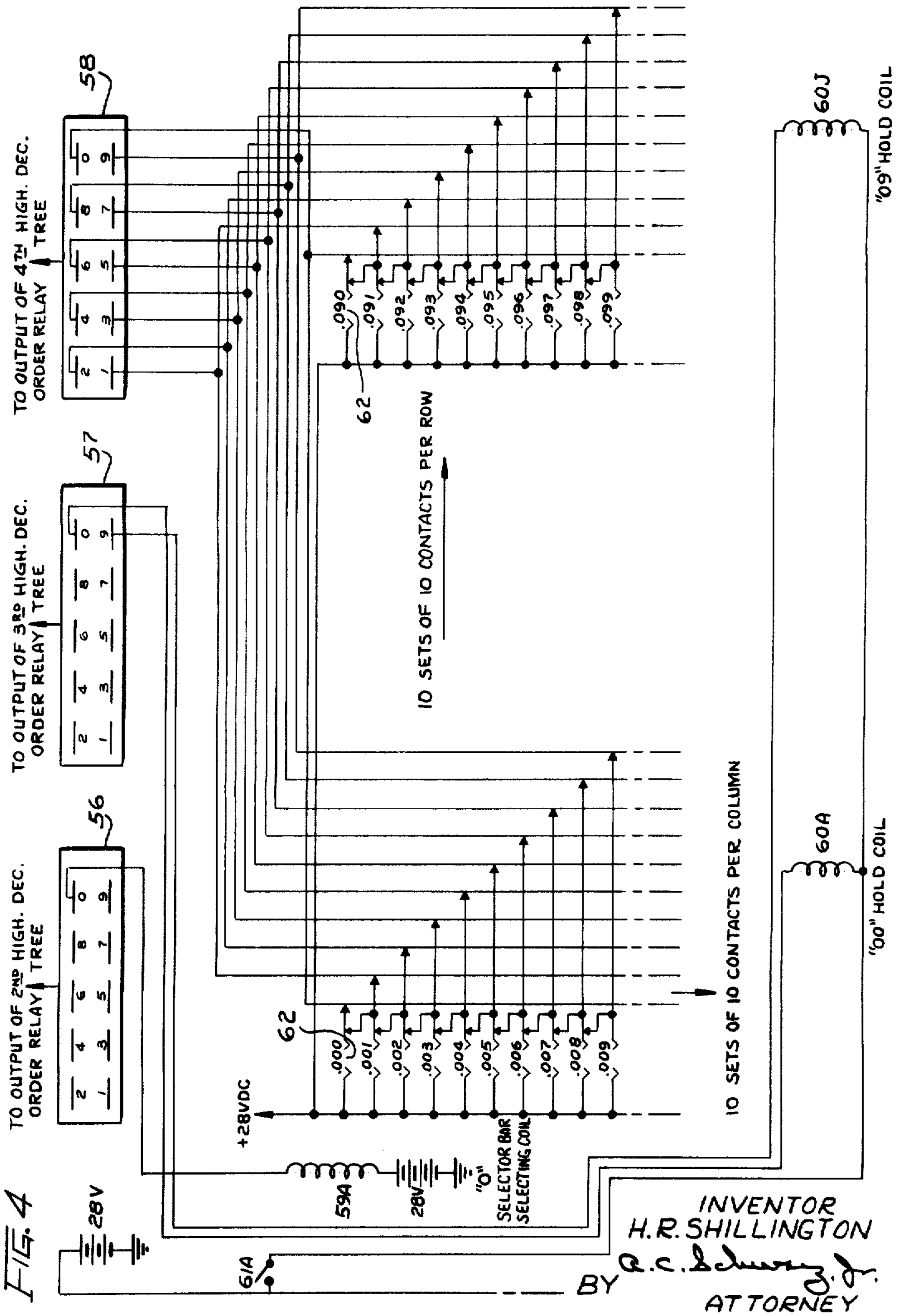
FIG. 4 is a schematic diagram of a telephone crossbar switch circuit illustrated by block 18 in FIG. 1 illustrating the interconnection between the outputs of three relay tree circuits so that a single data signal representative of these three outputs is produced.

As various ones of the control relays K1–K16 of the scanner circuit are energized in response to the firing of various ones of the control triodes V1A–V8B when the coded digital data signals of the selected digits are applied to the control triode grids, associated ones of the control relay contacts K1A–K16B in the relay tree circuits are moved to their secondary terminals. A unitary data signal is provided at one of the ten output terminals of each relay tree circuit if relay contacts K18A, B, and C are closed and the data signal provided at the output 44 of the highest decimal order relay tree circuit 40 corresponds to the presetting of the selector switch SW8. The unitary data signals provided at the outputs 45, 46, and 47 of the second, third, and fourth highest decimal order relay tree circuits 41, 42, and 43 are transmitted through terminal blocks 56, 57, and 58 to the telephone crossbar switch circuit 18 (see FIG. 4). Each of the terminal blocks has ten output terminals corresponding to the ten output terminals of the associated one of the relay tree circuits.

A second set of four relay tree circuits 48–51 illustrated in FIG. 9 are provided which are identical to the relay tree circuits 40–43 and operate concomitantly therewith. Nixie tubes (numerical display tubes) 52–55, which provide visual displays of numbers, are connected to the outputs of the secondary relay tree circuits so that a visual check reading of the data signals provided at the outputs of the relay tree circuits 40–43 is provided and so that a check test, as described below, may be made to see that the scanner circuit 15 is operating correctly. The second set of relay tree circuits is not dependent upon the closing of extraneous relay contacts to become effective but the relay tree circuits are only dependent on the energization of various ones of the control relays K1–K16.

The crossbar switch circuit 18 (FIG. 4), which includes 1000 jack plug sockets 62, consists of ten rows and ten columns of normally open relay contacts wherein ten sets of ten relay contacts are included in each row and each column. Each row of relay contacts includes a set of ten contacts from each column and each column includes a set of ten relay contacts from each row. A group of ten jack plug sockets is provided for each possible combination of association of a set of contacts in a row with a set of contacts in a column and the rows and columns of contacts provide 100 groups of ten jack plug sockets.

One of ten selector bar selecting coils 59A–59J is associated with each of the rows of contacts and, when one of the selector bar selecting coils is energized, the relay contacts in the associated row are closed. Each selector bar selecting coil has one end thereof connected to a positive potential and the other end thereof connected to one of the ten output terminals of the terminal block 56 so that, when a ground data signal is provided at one of the terminal block contacts by the second highest decimal order relay tree circuit 41, the associated selector bar selecting coil is energized to close the relay contacts in the associated row. Thus it may be seen that each row of relay contacts is representative of one of the ten possible digits of the second highest decimal order of the selected coded digital output digits.

One of ten hold coils 60A–60J is associated with each column of relay contacts and, when one of the hold coils is energized, the relay contacts in the associated column are closed. Each hold coil has one end thereof connected to a positive potential through a parallel arrangement of ten normally open selector bar contacts 61A–61J of the selector bar selecting coils 59A–59J, and the other end thereof connected to one of the ten output terminals of the terminal block 57 so that, when one of the selector bar selecting coils is energized to close the associated one of the contacts 61A–61J and when a ground data signal is provided at one of the terminal block output terminals by the third highest decimal order relay tree circuit 42, the associated hold coil is energized to close the relay contacts in the associated column. Thus it may be seen that each column of relay contacts is representative of one of the ten possible digits of the third highest decimal order of the selected coded digital output digits and that operation of the hold coils is dependent on operation of one of the selector bar selecting coils.

Each of the ten output terminals of the terminal block 58 is connected through a selector bar selecting coil contact in each one of the rows of contacts and through a hold coil contact in each one of the columns of contacts to a jack plug socket 62 in each group of ten jack plug sockets. When one of the selector bar selecting coils and one of the hold coils have been energized, the selector bar selecting coil contacts and the hold coil contacts associated with one of the groups of ten jack plug sockets are closed and the ground data signal from the fourth highest decimal order relay tree circuit 43 is transmitted though the terminal block 58 to one of the jack plug sockets 62 within this group of jack plug sockets.

Thus it may be seen that each jack plug socket 62 within a group of ten jack plug sockets is representative of one of ten possible digits of the fourth highest decimal order of the selected digital output digits and that the transmission of a ground data signal to one of the jack plug sockets is dependent on the energization of one of the selector bar selecting coils and one of the hold coils. A data signal presented at a jack plug socket is representative of a three digit number from 000 to 999 represented by the second, third, and fourth highest decimal orders of the selected coded digital output digits. Actually, the data signal presented at a jack plug socket 62 is representative of a four digit number from 0000 to 9999 since the output transmission of the second highest decimal order relay tree circuit is dependent on the output transmission of the highest decimal order relay tree circuit. Single data signals produced in the crossbar switch circuit are transmitted to the cell memory circuit.

The cell memory circuit 19 is illustrated in FIG. 5 and controls the coding of a capacitor carrying fixture so that a measured capacitor is ejected into a container for a capacitance range within which its measured value of capacitance falls. The cell memory circuit includes ten jack plugs 66A–66J and each jack plug is inserted into one of the jack plug sockets 62 in the crossbar switch circuit 18. One of the ten channel relays 67A–67J is independently connected in series with each of the jack plugs so that one of the channel relays is energized in response to the application of a ground signal to an associated one of the jack plugs.

When inserted in the jack plug sockets, the jack plugs 66A–66J divide the crossbar switch circuit into ten output ranges and, if a ground data signal is presented at a jack plug socket into which a jack plug is inserted, the associated one of the channel relays 67A–67J is energized. The crossbar switch circuit is so constructed that if a ground data signal is presented at a jack plug socket between two jack plug sockets into which jack plugs are inserted, the ground data signal is applied to the jack plug inserted in the jack plug socket for receiving a data signal representative of a higher three digit number and the associated one of the channel relays is energized. Since the crossbar switch circuit 18 is a standard circuit used in the telephone art, the construction features thereof will not be described in further detail.

Each of the channel relays 67A–67J has a normally open channel relay contact 68A–68J which is closed when the associated channel relay is energized. Closing of one of the channel relay contacts causes one or more of four memory circuit solenoids 69A–69D to have a 110 volt A.C. input designated as C+ applied thereto and thus causes one or more of the memory circuit solenoids to be energized. The energized memory circuit solenoids effect the coding of the fixture carrying the capacitor in test by depressing various pins projecting therefrom. Subsequently, when the conveyor moves the capacitor carrying fixture past various capacitor ejection stations, the nondepressed projecting pins correspond to and cooperate with pins adjacent one of the ejection stations to cause the capacitor to be ejected into a container for the particular capacitance range within which the valve represented by the data signal from the crossbar switch circuit falls. Any satisfactory mechanism may be utilized to cooperate with the projecting pins in causing the capacitors to be ejected into the prescribed containers.

The four memory circuit solenoids are utilized for controlling the capacitor ejection into any one of ten containers through various combinations of operation as illustrated in the key table of FIG. 8. Each of the containers is associated with one of the jack plugs 66A–66J and thus the valve range for each container is determined by inserting the jack plugs into preselected ones of the jack plug sockets in the crossbar switch circuit. If the test results of the capacitor in test do not cause actuation of any of the memory circuit solenoids, the capacitor is automatically ejected into an eleventh container for rejects.

*Operation*

Figure 6:
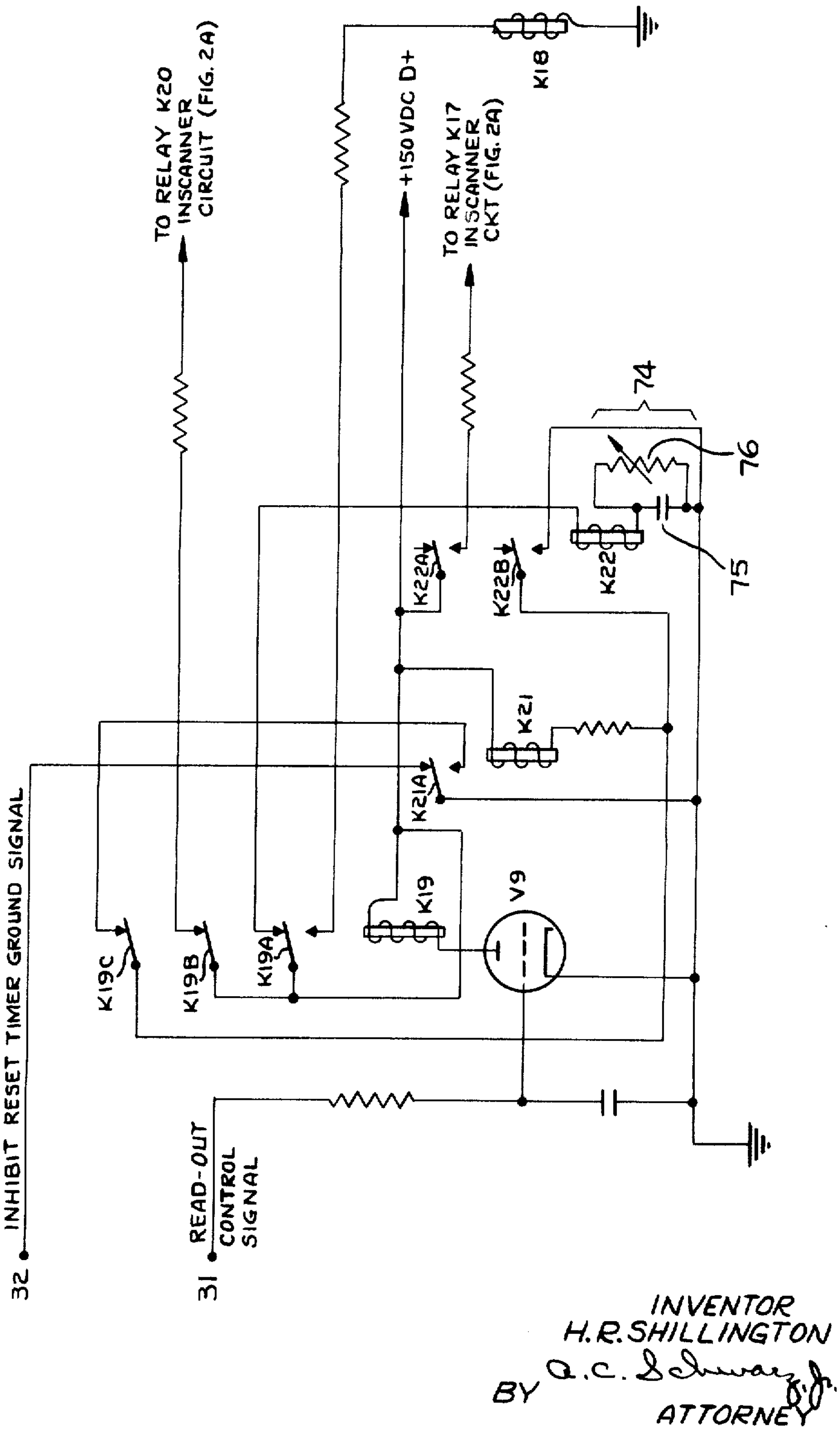
FIG. 6 is a schematic diagram of a control circuit illustrated by block 21 in FIG. 1 illustrating relays so interconnected that they control the operation of the various circuit elements of this invention to provide the desired results.

The control circuit 21 (FIG. 1) illustrated in detail in FIG. 6 controls the operation of the previously described circuits. At the beginning of a test cycle, a fixture carrying a new capacitor to be measured is moved to the capacitance measuring work station and a charging potential is applied to the capacitor. When the charging potential is applied to the new capacitor, a start signal is produced and is transmitted to the counter operation circuit 20. In response to the start signal, the counter operation circuit opens gate 12 to initiate transmission of pulses from the pulser 11 to the counter 13 so that the transmitted pulses are counted.

When the capacitor in test has charged to a predetermined potential, a stop signal is produced and is transmitted to the counter operation circuit 20. In response to the stop signal, the counter operation circuit closes gate 12 which prohibits further transmission of pulses from the pulser 11 to the counter 13 and causes a negative voltage signal to be transmitted from the counter operation circuit through a terminal 31 to the grid of a control triode V9 of the control circuit 21.

The cathode of the control triode V9 is connected to ground and the plate thereof is connected through a control winding of a control relay K19 to a positive potential designated as D+. In response to the application of the negative voltage signal to its grid, the control triode is placed in a nonconducting state and thus the control relay K19 is placed in a deenergized condition. The control relay 19 has three contact arms K19A, K19B, and K19C associated therewith and these contact arms are placed in engagement with their primary (deenergized) contact terminals when the control relay K19 is deenergized.

When the contact arm K19A is in engagement with its primary contact terminal, a relay tree circuit relay K18 is open circuited (deenergized) since it is connected to the secondary contact terminal of the contact arm K19A and a momentary operating relay K22 is energized since one end thereof is connected to ground through a parallel resistor-capacitor network 74 and the other end thereof is connected through the contact arm K19A to the positive D.C. potential designated as D+. The relay K22 remains energized for a period of time required for a capacitor 75 in the RC network 74 to charge to a predetermined potential. A resistor 76 of the RC network is variable so that the charging time of the capacitor 75 is adjustable and thus the period of operation of the RC network is adjustable.

When relay K18 is deenergized, relay contacts K18A–K18C are opened so that the relay tree circuits 40–43 are ineffective to decode the selected coded digital output digits and therefore no data signals are transmitted from the relay tree circuits to the crossbar switch circuit 18.

Energization of relay K22 closes normally open contact K22A, which connects the positive D.C. potential designated as D+ through contact K22A and through normally closed contacts of a manual switch SW1 to the reset relay K17 (see FIG. 2A), and thus causes the reset relay K17 to be energized so that its normally closed contact K17A (see FIG. 2B) is opened. When the contact K17A is opened, the positive D.C. voltage source designated as A+ is removed from the scanner circuit which causes previously energized ones of the scanner circuit control relays K1–K16 to be deenergized so that the relay tree circuit contacts and control relay lock in contacts are moved to their primary contact terminals. Thus, the scanner circuit is conditioned for accepting new coded digital data signals.

When contact arm K19B is in engagement with its primary contact terminal, the scanner circuit relay K20 (see FIG. 2A) is energized since one of the ends thereof is connected to ground and the other end thereof is connected through normally closed contacts of a manual switch SW2 and through the contact arm K19B to the positive potential designated as D+. When the scanner relay K20 is energized, the coded digital data signals of the selected digits are transmitted to the grids of the control triodes V1A–V8B to cause the control triodes having positive or ground potential data signals applied to their grids to conduct. Various ones of the control relays K1–K16 are energized in response to the conducting of various ones of the control triodes V1A–V8B and the energized control relays are locked in the energized position by closing of their normally open locking contacts K1E–K16E in response to their energization.

Relays K22 and K17 are fast acting relays and relay K20 is a slow acting relay so that relays K22 and K17 are energized and deenergized within the time period required for relay K20 to be energized. As a result, the coded digital data signals are transmitted to the grids of the control triodes V1A–V8B subsequent to the conditioning of the scanner circuit for receiving new data signals.

Energization of relay K22 also closes normally open contact K22B which connects relay K21 in the control circuit 21 between the positive D.C. potential designated as D+ and ground so that relay K21 is energized. Contact K21A moves from its primary terminal to its secondary terminal in response to energization of relay K21 so that relay K21 is locked in around relay K22 through contact arm K19C since contact arm K19C is in engagement with its primary contact terminal to permit relay K21 to remain energized after relay K22 is deenergized and so that an inhibit reset timer ground signal is removed from the counter operation circuit 20 to initiate operation of the timer circuit 22 contained within the counter operation circuit.

When the timer circuit 22 times out, it resets the counter 13 to a 0 condition by applying a signal to the flip flops included in the counter 13 which causes all the flip flops to be placed in the first condition and thus causes a 0 signal to be applied to each of the binary lines. When it times out, the timer circuit also conditions the counter operation circuit 20 for receiving a subsequent start signal and causes a positive D.C. signal to be transmitted through terminal 31 to the grid of the control triode V9 within the control circuit 21. The control triode V9 conducts in response to the application of the positive D.C. signal to its grid and the control relay K19 is energized by the control triode conducting current. In response to the energization of relay K19, the relay contact K19A is moved from its primary terminal to its secondary terminal and the relay contacts K19B and K19C are disengaged from their primary terminals.

The timer circuit 22 provides sufficient time for the coded digital data signals to be transmitted from the counter 13 to the grids of the control triodes V1A–V8B in the scanner circuit before the counter 13 is reset to a 0 condition. If a start signal is applied to the counter operation circuit 20 before the timer circuit times out, the start signal has no effect on the counter operation circuit since the timer circuit must time out before the counter operation circuit is conditioned to accept a start signal.

Since contact K19A moves from its primary terminal to its secondary terminal, relay K22 is open circuited so that it may not be energized and the relay tree circuit relay K18 is connected between ground and the D.C. potential designated as D+ so that it is energized.

When contact K19B is moved out of engagement with its primary terminal, relay K20 is deenergized to move its contacts from their secondary terminals to their primary terminals so that the output terminals of the counter 13 are disconnected from the grids of the control triodes V1A–V8B and so that the negative D.C. potential designated as B— is applied to the grids of the control triodes to place the control triodes in nonconducting states. As a result, the counter 13 is isolated from the scanner circuit 15 and a new capacitor may be placed in test to effect the transmission of new pulses from the pulser 11 to the counter 13 without effecting the scanner circuit 15.

When contact K19C is moved out of engagement with its primary terminal relay K21 is deenergized to move its contact K21A from its secondary terminal to its primary terminal so that the inhibit reset timer ground signal is applied to the the counter operation circuit 20 through terminal 32 to prohibit operation of the timer circuit, and thus resetting of the counter 13 is prohibited.

In response to the energization of relay K18, contacts K18A–K18C are closed so that, as described above, the relay tree circuits 40–43 become effective to provide straight decimal form data signals representative of the selected coded digital output digits, wherein each digit is represented by a single data signal.

The straight decimal form unitary data signals of the lower three decimal order relay tree circuits 41–43 are transmitted to the crossbar switch circuit 18, as described above, wherein a ground data signal is produced at one of the jack plug sockets. Data signals must be received from all three of the relay tree circuits before the ground data signal is produced in the crossbar switch circuit and the ground data signal is transmitted from the crossbar switch circuit to the cell memory circuit 19 wherein the capacitor carrying fixture, carrying the capacitor measured to provide the ground data signal, is coded so that the measured capacitor is ejected into a container for a predetermined capacitance range.

As mentioned above, the fifth terminal of each selector switch SW7A–SW7P, designated as terminal 0, is utilized to check the operation of the scanner circuit by simulation. When the selector switches SW7A–SW7P have their contact arms engaging the fifth contact terminals 0, a negative D.C. potential designated E— is connected to the selector switches through primary terminals of four manual switches SW3A–SW3D. When these manual switches SW3A–SW3D are closed (depressed), a positive D.C. potential designated as F+ is connected to the selector switches SW7A–SW7P through the secondary terminals of these manual switches.

Switch SW3A is associated with selector switches SW7A, E, I, and M; switch SW3B is associated with selector switches SW7B, F, J, and N; switch SW3C is associated with selector switches SW7C, G, K, and O; and switch SW3D is associated with selector switches SW7D, H, L, and P.

The previously referred to manual switch SW1 is provided so that, when it is momentarily depressed, the reset relay K17 is disconnected from the control circuit 21 and is connected between ground and a positive D.C. potential designated as G+, through the secondary terminals of the switch SW1, to cause energization thereof. The relay K17 may thus be manually operated momentarily to open contact K17A so that the positive D.C. potential designated as A+ is removed from the scanner circuit 15 and previously energized ones of the control relays K1–K16 are deenergized to place their contacts in engagement with their primary contact terminals.

The previously referred to manual switch SW2 is provided so that, when it is depressed, the scanner circuit relay K20 is disconnected from the control circuit 21 and is connected between ground and a positive D.C. potential designated at H+, through the secondary terminals of the switch SW2, to cause energization thereof. Thus, relay K20 may be manually operated to connect the grids of the control triodes V1A–V8B to the selector switches SW7A–SW7P.

By momentarily depressing switch SW1, by depressing switch SW2 and by depressing selected ones of the switches SW3A–SW3D when the contact arms of the selector switches SW7A–SW7P are engaging the fifth contact terminals, various coded digital outputs may be simulated to check the operation of the scanner circuit 15. For example, when all four switches SW3A–SW3D are depressed, the positive D.C. potential designated as F+ is connected to the grids of all the control triodes V1A–V8B which causes all the control triodes to conduct and all the control relays K1–K16 to be energized. By checking the key table illustrated in FIG. 7, it may be seen that the coded digital data signals of each digit are representative of the number 9 when all the data signals are positive. Therefore, a visual reading of the number 9999 should be provided on the Nixie tubes 52–55. When another number other than the one simulated is produced on one of the Nixie tubes, an operator is informed that the scanner circuit 15 is operating incorrectly and may take the necesasry steps to correct the scanner circuit operation.

The embodiment of the invention as described above, may now be seen to provide an improved, simple, and economical circuit for controlling both the transmission of new data signals to a first data storing circuit and the transmisison of data signals from a second data storing circuit in leading timed relationship with respect to the transmission of data signals from the first data storing circuit to the second data storing circuit, and to provide an improved, simple, and economical circuit for transforming a plurality of data signals into a single data signal representative of the plurality of data signals.

More specifically, it may be seen that a circuit has been provided for controlling the capacitance measuring of capacitors and the ejection of the capacitors into containers for various capacitance ranges. With this circuit, the capacitance value of a new capacitor may be measured while the ejection of the capacitor measured during the next preceding cycle of operation is controlled simultaneously.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. A circuit for decoding an encoded signal composed of at least three individual sets of data signals in binary bit form, each of the individual sets of data signals being representative of the value of a different digital order of a multidigit number, which circuit comprises:

means for simultaneously selecting for decoding at least two but not all of the individual sets of data signals; and a decoding circuit for transforming each of the selected, individual sets of data signals into a corresponding unitary data signal representative of the numerical value of the digital order of the multidigit number originally identified by the associated set of data signals.

2. The decoding circuit as recited in claim 1 further comprising a circuit for transforming the plurality of unitary data signals into a single data signal representative of the combined values of the plurality of unitary data signals.

3. The decoding circuit as recited in claim 2 further comprising means for storing the single data signal representative of the value of the plurality of unitary data signals so that the single data signal may be utilized subsequently as a control signal.

4. A circuit for decoding an encoded signal applied thereto composed of at least five individual sets of data signals in binary bit form, each of the individual sets of data signals being representative of the value of a different digital order of a multidigit number, which circuit comprises:

selector means for simultaneously selecting four consecutive, individual sets of data signals of the encoded signal to be decoded;

four decoding circuits each of which has both a first and a second input circuit and ten output circuits, said first input circuit of each of said decoding circuits having applied thereto a different one of the four sets of data signals to be decoded, each of said decoding circuits in response to a control signal applied to the second input circuit thereof transforming a set of data signals applied to the first input circuit thereof into a unitary data signal at the particular one of said ten output circuits in correspondence with the value of the decoded set of input data signals;

adjustable selector means for connecting a particular one of said ten output circuits of said decoding circuit transforming the highest decimal order set of data signals into a unitary data signal to said second input circuit of said decoding circuit transforming the second highest decimal order set of data signals;

means for applying an input control signal to said second input circuits of said highest, third highest and fourth highest order decoding circuits, the input signal applied to said highest order decoding circuit producing an output signal on one of said ten output circuits of said second highest order decoding circuit representative of the value of the set of data signals decoded in said second highest order decoding circuit only when said adjustable selector means is associated with said output circuit of said highest order decoding circuit which represents the value of the set of data signals decoded in said highest decimal order decoding circuit, and the input signals applied to said third and said fourth highest order decoding circuits respectively producing output signals on one of said ten output circuits of said third and fourth decoding circuits which output signals represent the values of the sets of data signals decoded in said third and fourth decoding circuits;

means responsive to the simultaneous unitary data output signals from all but said highest order decoding circuit for transforming said last-mentioned signals into a single data signal representative of the three lower order sets of data signals decoded; and means for storing said single data signal so that it may be utilized subsequently as a control signal.

5. A circuit for decoding an encoded signal applied thereto composed of at least five individual sets of data signals in binary bit form, each of the individual sets of data signals being representative of the value of a different digital order of a multidigit number which circuit comprises:

selector means for simultaneously selecting four consecutive, individual sets of data signals of the encoded signal to be decoded;

four decoding circuits respectively associated with the four selected sets of data signals, each of said decoding circuits having ten output terminals representative of the ten possible numbers of any one digit represented by a set of data signals, and providing upon the application of a set of data signals and a control signal at two respective inputs thereof a unitary data signal at a particular one of said output terminals of said decoding circuit corresponding to the representative value of the applied set of data signals;

adjustable selector means for connecting a particular one of said output terminals of said highest order decoding circuit to the control signal input circuit of said second highest decoding circuit so that the single data signal appearing at an output terminal of the highest order decoding circuit must correspond to a preselected output terminal determined by the adjustable selector means before a unitary data signal can appear at an output terminal of the second highest order decoding circuit, the output of the lower three consecutive order decoding circuits being representative of a three digit number;

means responsive to the unitary decoded data signals respectively appearing at the output terminals of the three lower order decoding circuits for providing a single data signal representative of a three digit number; and means for storing said single data signal so that it may be utilized subsequently as a control signal.

6. A circuit for controlling the measuring and sorting of capacitors, which comprises means for producing a coded digital output representative of the capacitance value of a capacitor being measured, said means including a pulser apparatus for producing sequential electrical pulses and a storage-transformation apparatus for counting electrical pulses transmitted thereto and for producing and storing the coded digital output representative of the number of electrical pulses counted, each digit of the coded digital output being represented by a plurality of independent data signals, means for selecting a prescribed group of the coded digital output digits, a storage-decoding circuit for storing the data signals of the selected coded digital output digits and for transforming the selected coded digital output digits into straight decimal digital form wherein each digit is represented by a single data signal, means responsive to the straight decimal digital form data signals for effecting the sorting of measured capacitors according to the range within which the measured capacitance values fall, and cyclically operable control means which includes (1) cyclically operable means for initially permitting the transmission of pulses from the pulser to the storage-transformation apparatus for a period of time required to charge a capacitor being measured to a predetermined potential so that the number of pulses counted is representative of the capacitance value of the capacitor and subsequently prohibiting the transmission of pulses therebetween, (2) means operable in timed relationship with respect to the cyclically operable means for initially prohibiting transmission of data signals from the storage-transformation apparatus to the storage-decoding circuit and for subsequently permitting the transmitting of data signals therebetween, and (3) means operable in timed relationship with respect to the cyclically operable means for initially permitting data transmission from the storage-decoding circuit to the responsive means and for subsequently prohibiting data transmission therebetween.

7. The circuit for controlling the measuring and sorting of capacitors as recited in claim 6 wherein the responsive means includes means responsive to the straight decimal digital form data signals for producing a single data signal representative of the value thereof and means responsive to single data signals representative of the values of the straight decimal digital form data signals for effecting the sorting of measured capacitors.

8. The circuit for controlling the measuring and sorting of capacitors as recited in claim 6 wherein the selecting means includes a plurality of selector switches having a plurality of contact terminals connected to the output terminals of the storage-transformation apparatus, the selector switches being equal in number to the total number of data signals of the selected coded digital output digits and being divided into a plurality of groups corresponding to the selected number of coded digital output digits, each group of selector switches being operable as a gang switch, the contact terminals being so connected to the coded digital output terminals that for each contact setting of each group of selector switches a specific coded digital output digit is selected to be processed.

9. The circuit for controlling the measuring and sorting of capacitors as recited in claim 8 wherein all the selector switches are operable as a single gang switch for selecting a desired number of consecutive coded digital output digits to be processed, the first contact terminal of each selector switch being independently connected to only one of the outputs of a highest possible combination of the desired number of consecutive digits and each succeeding contact terminal of each selector switch being independently connected to only one of the outputs of a succeeding possible combination of the desired number of consecutive digits so that any combination of the desired number of consecutive coded digital output digits may be preselected by presenting the gang operable selector switches to one of their contact terminal settings.

10. The circuit for controlling the measuring and sorting of capacitors as recited in claim 9 wherein the coded digital data signals provided by the storage-transformation apparatus are either (1) positive or ground signals, or (2) negative signals, and wherein the storage-decoding circuit includes, a plurality of control triodes equal in number to the total number of selector switches, the grids of each control triode being connected independently to one of the selector switches so that the associated control triode conducts in response to the application of a positive or ground signal to its grid, a coded digital signal being applied to each grid through one of the selector switches for each contact terminal setting of the gang operable selector switches, a plurality of control relays equal in number to the control triodes, each control relay being independently connected to one of the control triodes for energization in response to the conducting of the associated one of the control triodes, and a plurality of relay tree circuits equal in number to the number of selector switch groups for providing straight decimal digital form data signals representative of the selected coded digital output digits, each relay tree circuit including relay contacts of the control relays associated with one of the groups of selector switches and having ten output terminals representative of the ten possible numbers of any one digit, the relay contacts being so arranged in each relay tree circuit that a single data signal is provided at only one of the relay tree output terminals for any possible combination of control relay energizations.

11. The circuit for controlling the measuring and sorting of capacitors as recited in claim 10 wherein a timer circuit is provided for timing out in a preset period of time, means responsive to the energization of the control relays are provided for locking the control relays in their energized positions, and the cyclically operable control means includes, cyclically operable means for initially permitting transmission of pulses from the pulser to the storage-transformation apparatus for a period of time required to charge a capacitor being measured to a predetermined potential so that the number of pulses counted is representative of the capacitance value of the capacitor and for subsequently prohibiting transmission of data signals therebetween, means operable momentarily in response to the prohibiting operation of the cyclically operable means for negating the effect of the locking means so that the control relays energized during the next preceding cycle of operation are deenergized, means operable concomitantly with the negating means for (1) initiating transmission of data signals from the storage-transformation apparatus to the grids of the control triodes, (2) prohibiting data transmission from the relay tree circuits to the responsive means, and (3) initiating operation of the timer circuit, and operable in a reverse manner in response to the timing out of the timer circuit so that the initiating operations become prohibiting operations and the prohibiting operations become initiating operations, and means operable momentarily in response to the timing out of the timer circuit for clearing data counted and stored during the next preceding cycle of operation in the storage-transformation apparatus and for conditioning the cyclically operable means for the next cycle of operation.

12. The circuit for controlling the measuring and sorting of capacitors as recited in claim 11 wherein each digit of the coded digital output is represented by four data signals and the selector switches are divided into four groups so that the selector switches select a group of four consecutive digits of the coded digital output.

13. The circuit for controlling the measuring and sorting of capacitors as recited in claim 11 wherein means are included for providing a visual numerical reading of the number represented by the output of each relay tree circuit.

14. The circuit for controlling the measuring and sorting of capacitors as recited in claim 13 wherein the means for providing a visual numerical reading includes a second plurality of relay tree circuits which are identical to the previously recited plurality of relay tree circuits and which operate concomitantly therewith, and a plurality of Nixie tubes equal in number to the second plurality of relay tree circuits and responsive to the outputs thereof for providing visual numerical readings of the numbers represented by the outputs of the relay tree circuits.

15. The circuit for controlling the measuring and sorting of capacitors as recited in claim 13 wherein each selector switch is provided with one more contact terminal than the total number of combinations of the desired number of consecutive digits, and wherein means are connected to the selector switch contact terminals not connected to the coded digital output terminals so that, when the gang operable selector switches are set to these contact terminals, operation of the data processing circuit may be simulated to provide a visual check reading of the circuit operation on the means for providing a visual numerical reading.

References Cited by the Examiner

UNITED STATES PATENTS

| | | | |
|---|---|---|---|
| 2,982,818 | 5/1961 | Kendall | 340—172.5 |
| 3,000,003 | 9/1961 | Einsel | 340—172.5 |
| 3,037,193 | 5/1962 | Barbagallo | 340—172.5 |
| 3,108,694 | 10/1963 | Crain et al. | 340—172.5 |

ROBERT C. BAILEY, *Primary Examiner.*

MALCOLM A. MORRISON, *Examiner.*

E. M. RONEY, W. M. BECKER, *Assistant Examiners.*